United States Patent [19]

Myles et al.

[11] Patent Number: 5,584,519

[45] Date of Patent: Dec. 17, 1996

[54] DISPOSABLE COLLECTION DEVICE FOR ANIMAL LITTER

[76] Inventors: J. Scott Myles; Michele Myles, both of 3181 Pebble La., Bloomfield Township, Mich. 48301

[21] Appl. No.: 453,220

[22] Filed: May 30, 1995

[51] Int. Cl.⁶ .............................. A01K 29/00; E01H 1/12
[52] U.S. Cl. .............................................. 294/1.3; 294/55
[58] Field of Search ........................... 294/1.3, 1.4, 25, 294/49, 55, 131; 15/104.8, 257.1, 257.2, 257.4, 257.6; 119/161; 383/6, 7, 10, 63, 127

[56] References Cited

U.S. PATENT DOCUMENTS

| | | | |
|---|---|---|---|
| 1,106,282 | 8/1914 | Coats | 15/257.1 X |
| 1,733,219 | 10/1929 | Duvall | 294/1.3 X |
| 2,453,973 | 11/1948 | Coats | 15/257.1 |
| 3,676,887 | 7/1972 | Klein . | |
| 3,806,984 | 4/1974 | Hilsabeck . | |
| 3,813,121 | 5/1974 | Marvin . | |
| 3,850,467 | 11/1974 | Johnson . | |
| 4,215,886 | 8/1980 | Naderi et al. | 294/1.3 |
| 4,483,560 | 11/1984 | Lordi | 294/1.3 |
| 4,741,565 | 5/1988 | Bagg . | |
| 4,752,093 | 6/1988 | Haber et al. | 294/1.3 |
| 5,064,233 | 11/1991 | Sloan . | |

FOREIGN PATENT DOCUMENTS

| | | | |
|---|---|---|---|
| 2499841 | 8/1982 | France | 294/55 |
| 2556560 | 6/1985 | France | 294/1.3 |
| 2695147 | 3/1994 | France | 294/1.3 |
| 3542098 | 6/1987 | Germany | 294/1.3 |
| 9428251 | 12/1994 | WIPO | 294/1.3 |

*Primary Examiner*—Johnny D. Cherry
*Attorney, Agent, or Firm*—Dykema Gossett PLLC

[57] ABSTRACT

The portable collection device has a longitudinal axis and includes a shovel made from board material having a tubular handle portion surrounding the longitudinal axis and a scoop portion having a bottom wall and a pair of laterally outwardly extending side walls hingedly connected to opposite edges of the bottom wall to form a scoop-like structure for collecting animal litter. The scoop portion is attached on one end to the handle portion and at the other end has a leading edge for use in collecting the animal litter. A flexible collection bag houses the shovel. The bag has a tubular stem portion surrounding the longitudinal axis, a large pouch portion with a sealable entrance opening at one end of the stem portion and a hand strap portion at the other end of the stem portion. The shovel has the tubular handle portion located in the tubular stem portion of the bag and the scoop portion located in the pouch portion. The hand strap permits the user to carry the collection device before and after the device is used to pick up litter.

15 Claims, 3 Drawing Sheets

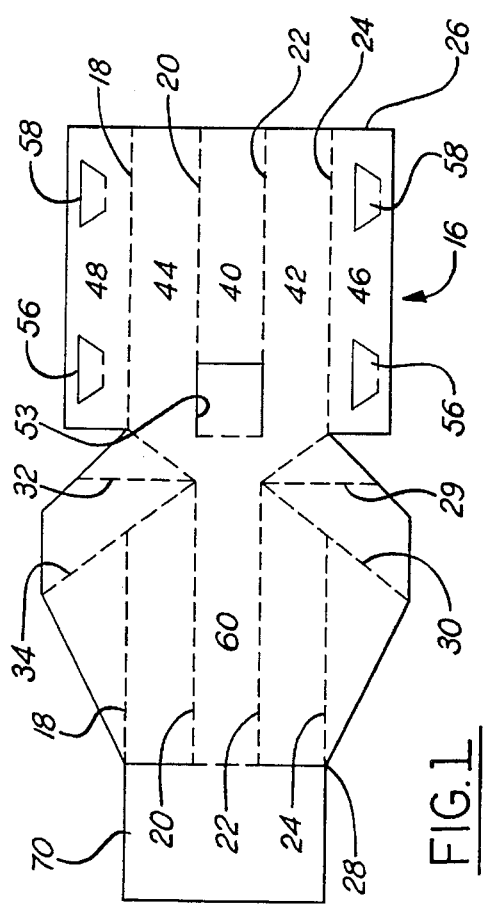
FIG.3
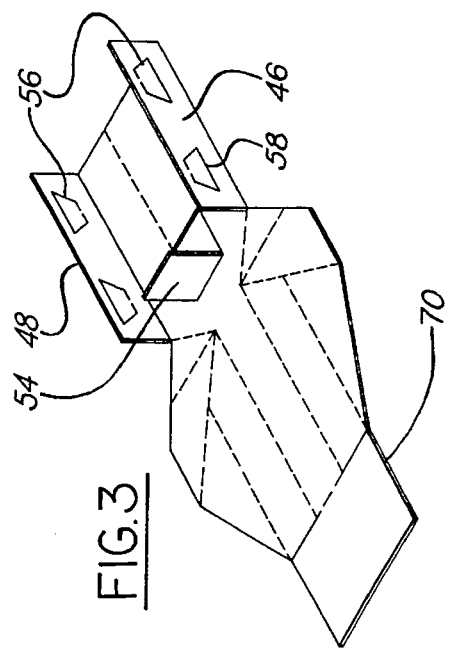
FIG.1
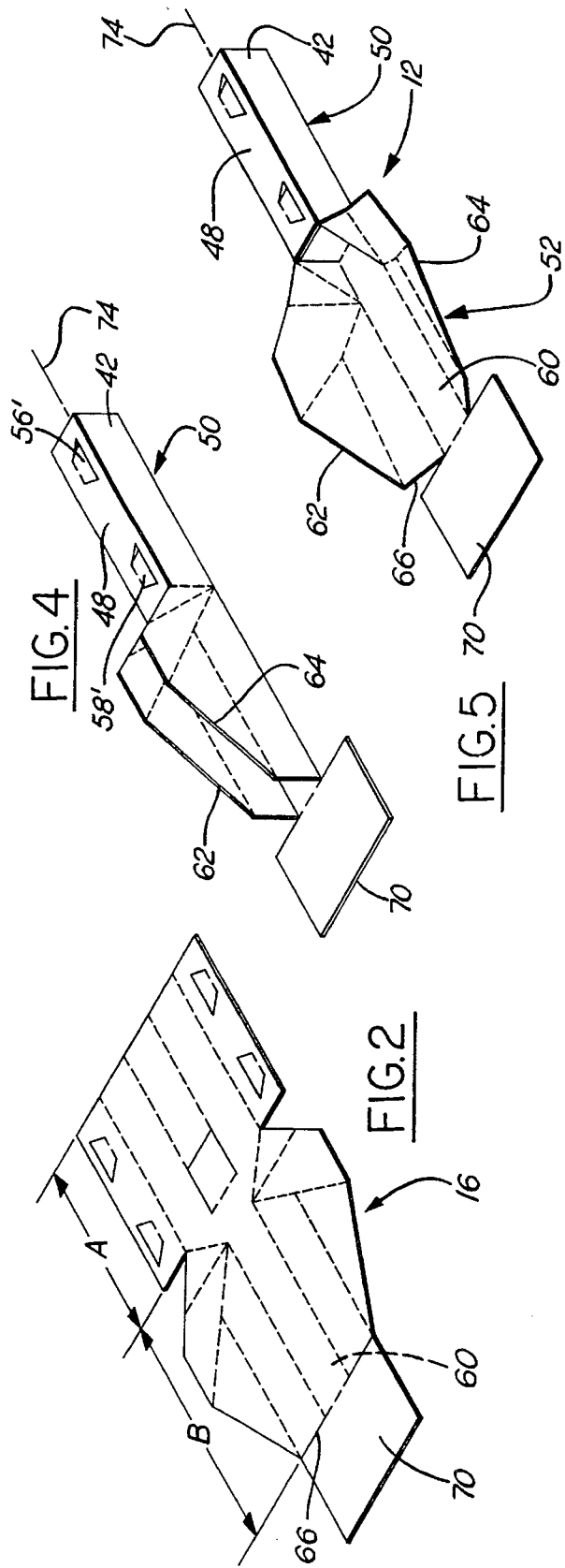
FIG.5
FIG.4
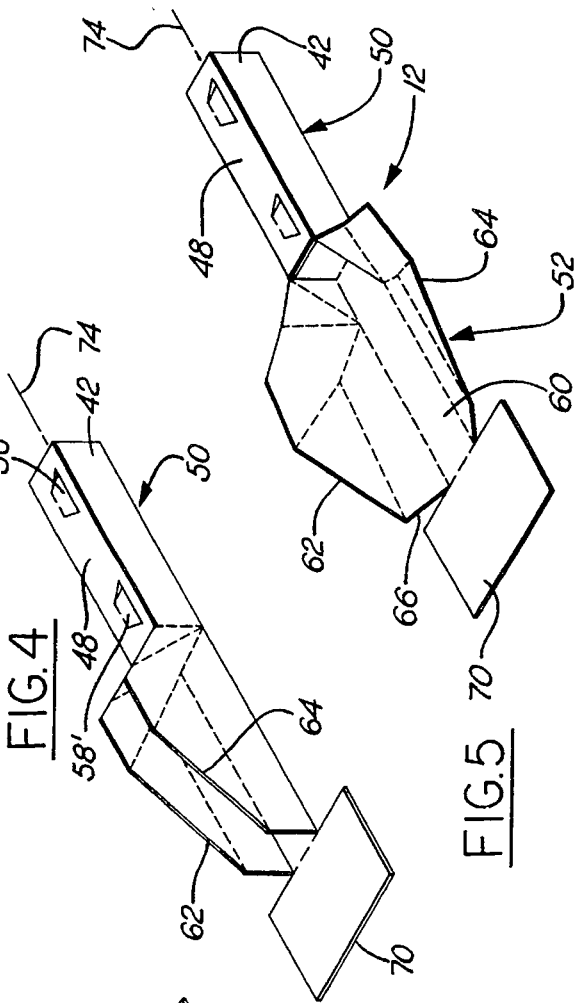
FIG.2

DISPOSABLE COLLECTION DEVICE FOR ANIMAL LITTER

BACKGROUND OF THE INVENTION

1. Field of the Invention

This invention relates to an improved portable device for collecting and disposing of animal excrement dropped by an animal. More specifically, the present invention relates to disposable litter shovels having means for collecting and storing the animal litter until a proper disposal site can be found. The invention includes a protective bag to protect the user's hand and arm from contact with the animal litter scooped up by the collection device and which is also used as a disposable bag containing the litter or feces and the disposable shovel.

2. Discussion of the Prior Art

The increase of urban populations, coupled with the increasing popularity of dogs and other pets, has created a serious sanitary problem in connection with the disposal of animal litter. Concern results not only from an aesthetic consideration but also because of the potential for the transmission of disease. Many pet owners have permitted their animals to deposit solid excrement on both private and public property. A number of communities throughout the United States have enacted ordinances requiring pet owners, under penalty of a fine, to retrieve and dispose of litter created by their pets.

Bloomfield Township of Michigan, enacted Dog Ordinance No. 423, which provides in Section 3 entitled "Sanitation" as follows: "It shall be unlawful for any person to permit any dog owned, possessed or harbored by him to deposit fecal matter any place other than the premises where the dog is harbored or kept, unless such fecal matter is immediately collected and removed to the premises where the dog is harbored or kept."

It has been found that the willingness of pet owners to retrieve and properly dispose of animal litter is related to the ease, convenience and economy with which the litter may be handled in a clean and sanitary manner. A number of collection devices and articles have been proposed for the purpose of collecting and thereafter disposing of animal litter. However, such devices have been deficient in certain respects. Some devices have been provided which are not completely disposable; thus, a user of the device must frequently clean the shovel or other apparatus used to collect the litter so as to prevent obnoxious odors and to provide for a safe and clean environment. Other types of devices which are disposable or are reusable are not completely sanitary, permitting or being susceptible of contact of the litter with the user's clothing or hands.

Other prior art devices are relatively large and cumbersome and are difficult to carry. Certain of the prior art devices require a person to use two hands to collect the waste material. Certain of the prior art devices are impractical to use and are expensive.

Thus, there has been a need in the prior art for a disposable portable collection device for animal litter which is compact, light-weight and relatively inexpensive. Such a collection device should be easily carried by a person using a hand which would also hold onto the leash of the animal. The present invention fulfills these needs and provide certain advantages over the prior art.

SUMMARY OF THE INVENTION

The present invention relates to a disposable portable collection device for animal litter which is inexpensive, light-weight and compact so that it can be easily carried by the hand of the user which also holds on to the leash attached to the animal. The portable collection device includes a combined shovel and collection bag. The shovel has a handle portion and a scoop portion which forms a receiver for the animal litter. The shovel is located in a large flexible bag, preferably constructed of a plastic material, such as polyethylene, which bag is capable of shielding a user's hand when grasping the shovel handle portion from the animal litter deposited upon the scoop portion.

Thus, the portable collection device of the present invention has a longitudinal axis and comprises in combination a shovel made from board material having a tubular handle portion at one end surrounding the longitudinal axis and a scoop portion at the other end having a leading edge and a pair of laterally outwardly extending side walls to form a scoop-like structure for collecting the animal litter. The scoop portion is attached to the handle portion and terminates at the leading edge of the shovel. A collection bag for the shovel has at one end a pouch portion with an enlarged opening for receiving the scoop portion of the shovel. The bag further includes a tubular stem portion surrounding the longitudinal axis and enclosing the handle portion of the shovel. The collection bag also includes at the other end a hand strap for carrying the device. Means are provided for sealing the open end of the bag by means of a ZIPLOCK-type fastener to fully enclose the shovel and any litter deposited within the bag. Once used, the entire collection device and the fully enveloped litter can be conveniently transported and disposed of properly according to local ordinances.

It should be understood that the portable collection device may be constructed in different sizes for use with animals which have correspondingly larger or smaller amounts of litter.

Thus, it is a feature of the present invention to have a collection device which has easy means for picking up unwanted feces or litter from various locations and to dispose of the picked-up material in a facile and clean fashion.

A further feature of the present invention is to provide a simple, inexpensive and effective collection device for picking up and thereafter transporting the litter.

Still another feature of the present invention is to provide a portable collection device consisting of a shovel made from a board material and a collection bag made from plastic material for shielding the user of the shovel and for transporting litter when collected and the disposable shovel.

Other features and advantages of the present invention will become apparent from the following detailed description, taken in conjunction with the accompanying drawings which illustrate, by way of example, the inventive concept.

BRIEF DESCRIPTION OF THE DRAWINGS

FIG. 1 is a top view of a shovel blank after the blank has been notched, cut, pierced and lined to define discrete areas of the blank.

FIG. 2 is a perspective view of the shovel blank after it has been removed from the press or die;

FIG. 3 is a perspective view showing the manner of forming the shovel blank into a shovel by various folding operations or steps;

FIG. 4 is a perspective view of the shovel showing an intermediate step for forming the handle portion;

FIG. 5 is a perspective view of the completed shovel;

DETAILED DESCRIPTION OF PREFERRED EMBODIMENT

Figure 6:
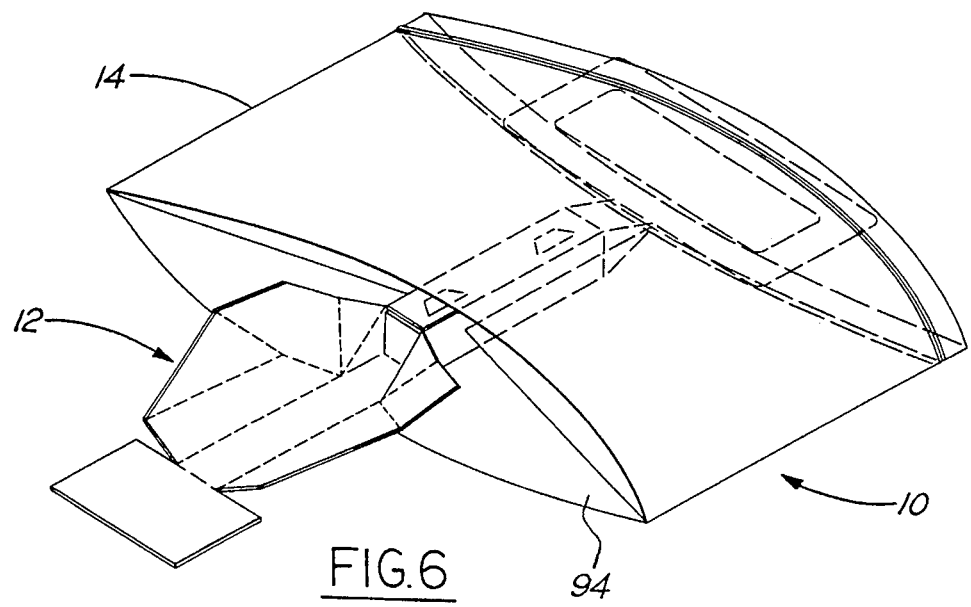
FIG. 6 illustrates the initial step of placing the shovel in the collection bag.
Figure 7:
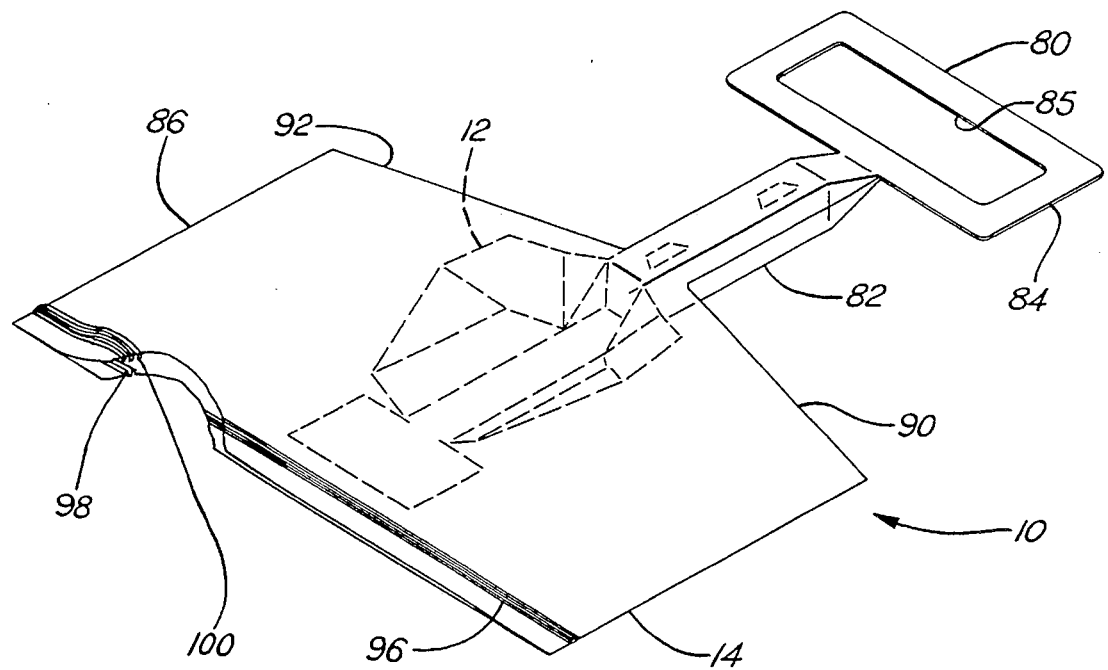
FIG. 7 is a perspective view showing the shovel mounted within the confines of the collection bag, with the entrance opening of the bag being closed by a ZIPLOCK-type sealing arrangement.

Referring now to the drawings, and in particular to Figures 6 and 7, there is illustrated a portable disposable collection device 10 comprising two essential elements, namely a disposable shovel 12 and a disposable collection bag 14. The collection device 10 is lightweight and is capable of being carried by the hand of the user who at the same time has the same hand holding the leash of the dog. The collection device 10 is easy to use so that the animal litter can be expeditiously collected and disposed of along with the collection device 10 after the user returns to his or her property.

Referring now to FIGS. 1–5 inclusive the shovel 12 is made from a board material, such as cardboard, pasteboard or corrugated cardboard. The term "board" or "board material" is used to designate pliable or flexible material suitable for the shovel. Corrugated cardboard provides an advantage over pasteboard, as an example, since it provides more compressive and tensile strength; especially with the flutes of the board running parallel with the handle portion of the shovel.

The shovel 12 made from board material is manufactured in a two-step process. The first step is to pre-cut a large board into blanks of a square or rectangular geometry large enough to contain the envelope of the finished product or shovel. The second manufacturing step is to feed the pre-cut board shapes into a reciprocating (generally for manual feed) or a spinning roller mandrel (generally for automatic feed) type machine. Such machine is provided with a die which will add notches, slots and perforated, fold and cut lines to the board giving it its final geometry, such as the blank 16 as is shown in FIG. 1. The blank 16 is folded into the final configuration of the shovel 12 as shown in FIG. 5.

Referring once again to FIG. 1, the blank 16 after it has been removed from the reciprocating or spinning roller mandrel machine mentioned previously is in the configuration shown in FIG. 1 where the blank 16 has been notched, cut and fold lines provided. The blank 16 includes fold lines 18, 20, 22 and 24 which extend from one end 26 of blank 16 to near the other end 28. The blank 16 has an area "A" for forming the tubular handle portion 50 and a connected area "B" for forming the scoop-like structure 52. The fold lines 18–24 inclusive are parallel to one another and are interrupted near the mid-section of the blank 16 between areas A and B.

Fold lines 18–24 help to define the hingedly connected bottom wall 40, side walls 42, 44 and top walls 46, 48 of the tubular handle portion 50. During the formation of the blank 16, the bottom wall 40 of Area A has an opening 53 formed therein. A tab 54 is struck out of the opening 53 and bent 90°, as is shown in FIG. 3.

The top walls 46 and 48 are provided with a pair of tab formations 56 and 58 which are struck out of the top walls 46 and 48 to form tabs 56' and 58'. The tabs of the top wall 48 are designed to interlock with the slot formations of the corresponding underlying top wall 46 to form the tubular handle portion 50.

The scoop area B of blank 16 includes the extensions of the longitudinal fold lines 18–24 and laterally extending fold lines 29, 30, 32 and 34. The scoop-like structure 52 has a bottom wall 60 and a pair of laterally outwardly extending side walls 62, 64 which are hingedly connected to the longitudinal edges of the bottom wall 60 to form the scoop-like structure 52 for collecting the animal litter.

Figure 8:
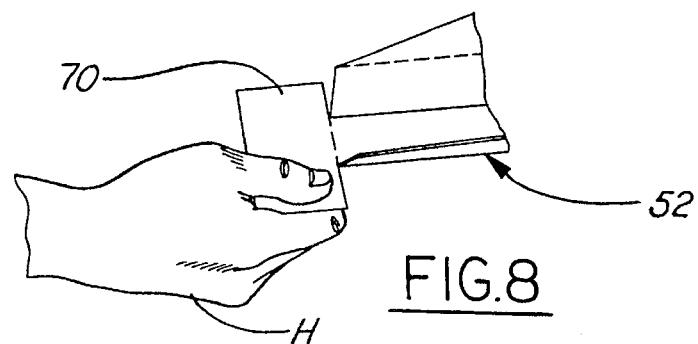
FIG. 8 is a fragmentary view of the shovel showing a person removing the scrapper blade from the shovel.
Figure 9:
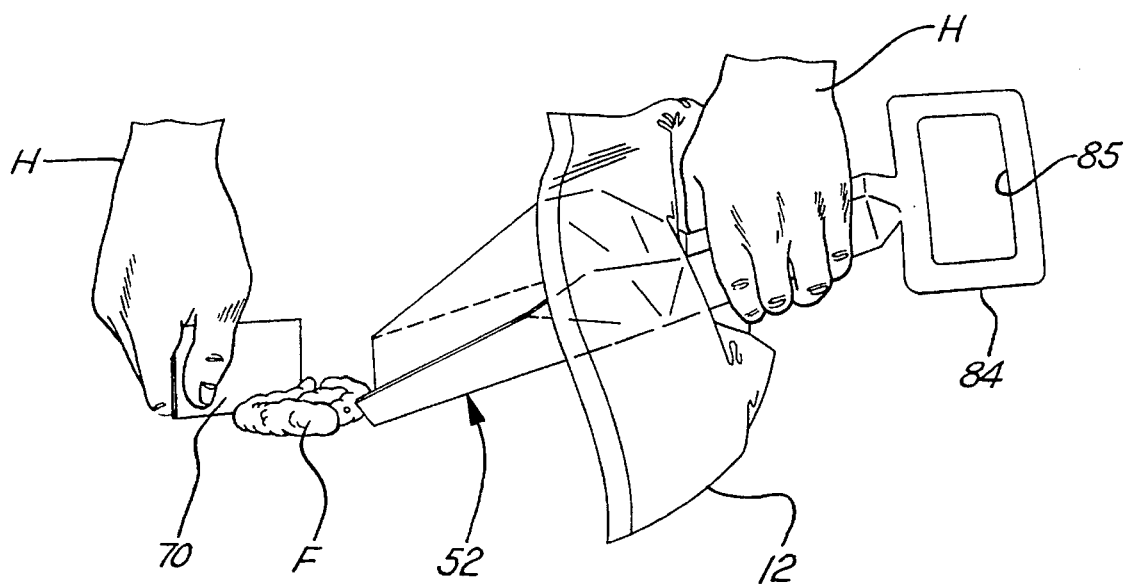
FIG. 9 is a perspective view showing a person using both hands in directing the litter onto the shovel and thereafter into the collection bag for subsequent disposal along with the shovel and blade.

The leading edge 66 of the shovel blank 16 is provided with a detachable scraper or scraper blade 70. The scraper blade 70 is of generally rectangular configuration and may be detached from the shovel 12 and used by the person in scraping the litter onto the shovel scoop 52 as is illustrated in FIGS. 8 and 9.

After the formation of the blank 16, as shown in FIGS. 1 and 2, the bottom, side and top walls of the tubular handle portion 50 are folded along their respective fold lines, into the configuration illustrated in FIG. 3, and thereafter to the positions as shown in FIGS. 4 and 5. The top wall portions 46, 48 which are provided with the tab formations 56, 58 are inserted so that the tabs 56' and 58' of the upper top wall 48 will fit into the slots of the underlying top wall 46.

The tubular portion 50 has a centrally located longitudinal axis 74 extending therethrough from one end of the shovel to the other end. The axis 74 is spaced from the walls of the tubular handle portion 50 and also from the bottom and side walls 62, 64 of the scoop-like structure 52.

The flexible collection bag 14 has a longitudinal axis 80 which coincides or is aligned with the longitudinal axis 74 of the shovel 12. The flexible collection bag 14 is made from a biodegradable plastic material such as polyethylene. The bag 14 has a tubular stem portion 82 intermediate the hand strap 84 and the large pouch portion 86 of the bag 14. The pouch portion 86 is integrally attached to the stem portion 82 on one end as shown on FIG. 7. The pouch portion 86 has a width measured perpendicular to the axis 80 which is substantially greater than the width of the tubular stem portion 82 as well as the width of the hand strap 84. The strap 84 has a rectangular hand opening 85 provided therein to accommodate a hand. The pouch portion 86 has a closed end 90 to which the stem portion 82 is integrally connected. The closed end 90 has a pair of outwardly extending tapered edges 92. The other end of the pouch portion 86 is provided with a sealable entrance opening 94. The entrance opening 94 is spaced from the tubular stem portion 82. The entrance opening 94 is provided with a sealable ZIPLOCK fastener 96 having a resealable male section 98 and a female section 100. Thus, the opening 94 is sealable after the shovel 12 is initially placed in the bag 14.

The tubular stem portion 82 has a length and width slightly larger than the length and width of the tubular stem portion 50 as shown in FIG. 7. The pouch portion 86 has a width which is substantially greater than the depth of the pouch portion which is measured along axis 80.

The contoured plastic bag 14 is manufactured in a two-step operation. The first step is to extrude the plastic through a die fixture with the resealable male and female sections 98 and 100 at each end. The extrusion has a semi-circular geometry as it enters a heat sealing and cutting die, which forms the extrusion into a bag shape. The secondary method step consists of placing the bag in a reciprocating-type machine with a heat sealing and cutting die to give the bag its final configuration as best shown in FIG. 7. In such a construction the edges of the bag are heat sealed except for the resealable opening 94.

After the shovel has been configured, it is then inserted into the narrow tubular stem portion 82 of the bag as shown in FIGS. 6 and 7. Thereafter the bag is sealed using a ZIPLOCK-type fastening arrangement 96 comprising the male and female sections 98 and 100 as shown in FIG. 7. The portable collection device 10 can be transported with the user carrying the hand strap 84 with the resealable opening 94 of the pouch portion 86 facing downwardly until the device 10 is ready to be used.

In use, the user unseals the ZIPLOCK-type fastener 96 of the bag 14, pulls the bag 14 over the hand H holding the shovel (inside the bag), scoops up the fecal material or litter F with the exposed scoop 52, and thereafter pulls the bag 14 up over the waste product F and reseals the ZIPLOCK bag 14. Thereafter, the owner can continue to walk his or her dog or pet holding onto the leash and also carrying the collection device 10 by the hand strap 84. Thus, the collection device 10 can be transported upside down by the hand strap 84 formed with the bag 14.

What claim is:

1. A portable collection device having a longitudinal axis comprising, in combination:

a shovel made from board material having a tubular handle portion surrounding said longitudinal axis and a scoop portion having a bottom wall and a pair of laterally outwardly extending side walls hingedly connected to opposite edges of said bottom wall to form a scoop-like structure for collecting animal litter, said bottom and side walls being spaced from said axis, said scoop portion being attached on one end to said handle portion and at the other end providing a leading edge for use in collecting the animal litter; and a flexible collection bag for said shovel, said bag having a tubular stem portion surrounding said longitudinal axis, a pouch portion with an entrance opening at one end of said stem portion and a hand strap portion at the other end of said stem portion;

said shovel having said tubular handle portion located in the tubular stem portion of said bag and said scoop portion located in said pouch portion, said hand portion strap permitting the user to carry the collection device before and after use.

2. The portable collection device defined in claim 1, wherein said hand strap portion has a centrally located opening therein to accommodate the user's hand.

3. The portable collection device defined in claim 1, wherein said tubular handle portion has a bottom wall, a pair of parallel side walls which are spaced apart and a pair of abutting top walls, each top wall being hingedly attached to a handle side wall, and tabs struck out of one of said top walls and engageable with corresponding slots truck out of the other of said top walls to mechanically lock and thereby form said tubular handle portion.

4. The portable collection device defined in claim 1, wherein a closing wall is partially struck out from said shovel bottom wall and remains hingedly attached to the bottom wall of said scoop portion for closing said tubular handle portion and thereby preventing litter from entering said handle portion.

5. A portable collection device defined in claim 1, wherein said tubular handle portion has a length substantially equal to the length of said tubular stem portion.

6. The portable collection device as defined in claim 1, wherein said scoop portion has a length less than the depth of the bag measured along said longitudinal axis.

7. The portable collection device as defined in claim 1, wherein a blade is attached to said leading edge of said scoop portion which, when removed from said shovel, may be used to assist the user in directing the litter on to the scoop portion for subsequent disposal with the bag, said blade being of generally rectangular configuration and after use, is placed in the bag for disposal along with the litter and shovel.

8. The portable collection device as defined in claim 1, wherein the entrance opening to said bag is provided with sealing means for enclosing the shovel, with or without litter, in the bag for subsequent use or for subsequent disposal.

9. The portable collection device as defined in claim 8, wherein said sealing means comprises a ziplock-type fastener.

10. The disposable collection device as defined in claim 8, wherein said bag is made from a plastic material, with the edges of said bag being heat sealed except for the entrance opening provided with said sealing means.

11. The portable collection device as defined in claim 10, wherein said plastic material is polyethylene.

12. The portable collection device as defined in claim 1, wherein said board material is taken from the group comprising cardboard, pasteboard and corrugated cardboard.

13. A flexible collection bag made from a plastic material having a longitudinal axis, said bag having a tubular stem portion surrounding said longitudinal axis, a pouch portion at one end of said stem portion and a hand strap portion at the other end of said stem portion, said pouch portion having a width measured perpendicular to said axis which is substantially greater than the width of said tubular stem portion and the width of said hand strap portion, said pouch portion having an entrance opening spaced from said tubular stem portion, said entrance opening being provided with sealing means comprising a fastener, the edges of the bag being heat sealed except for said entrance opening provided with said fastener.

14. The flexible collection bag defined in claim 13, wherein said plastic material is polyethylene.

15. The collection bag defined in claim 14, wherein said hand strap has a centrally located opening therein to accommodate the user's hand.

\* \* \* \* \*